United States Patent [19]

Kaltz

[11] 4,420,184
[45] Dec. 13, 1983

[54] PIVOTAL-SLIDING ROOF PANEL APPARATUS

[75] Inventor: Milton C. Kaltz, Allen Park, Mich.

[73] Assignee: American Sunroof Corporation, Southgate, Mich.

[21] Appl. No.: 327,356

[22] Filed: Dec. 4, 1981

[51] Int. Cl.³ .............................................. B60J 7/00
[52] U.S. Cl. .................................... 296/221; 296/222; 296/223
[58] Field of Search ................ 296/222, 223, 216, 221

[56] References Cited

U.S. PATENT DOCUMENTS

| | | | |
|---|---|---|---|
| 2,985,483 | 5/1961 | Bishop et al. | 296/219 |
| 3,266,328 | 8/1966 | Rott | 74/89.17 |
| 3,822,912 | 7/1974 | Bienert | 296/222 |
| 3,863,979 | 2/1975 | Bienert | 296/222 |
| 3,874,722 | 4/1975 | Pickles | 296/223 |
| 3,964,784 | 6/1976 | Prechter et al. | 296/222 |
| 4,081,926 | 4/1978 | Jardin | 49/210 |
| 4,085,965 | 4/1978 | Schlapp | 296/221 |
| 4,103,962 | 8/1978 | Schlapp | 296/221 |
| 4,210,359 | 7/1980 | Mori | 296/222 |
| 4,245,864 | 1/1981 | Shitanoki | 296/222 |
| 4,272,122 | 6/1981 | Schatzler | 296/221 |
| 4,364,601 | 12/1982 | Katayama | 296/221 |

FOREIGN PATENT DOCUMENTS 1933991 1/1971 Fed. Rep. of Germany ...... 296/222

Primary Examiner—Robert R. Song
Attorney, Agent, or Firm—Basile, Weintraub, Hanlon

[57] ABSTRACT

A pivotal-sliding roof panel apparatus for a vehicle having an opening in the roof. The apparatus includes a housing securable to the roof structure of the vehicle. A movable roof panel is slidably mounted within the housing and is selectively movable between closed, fully-opened and partially opened, venting positions. A drive motor and a pair of drive belts are connected to the movable roof panel for selectively moving the movable roof panel between various positions. Guide rails are mounted on the housing for directing the sliding movement of the movable roof panel. First and second lifters are mounted on opposed sides of the roof panel and are operative for raising and lowering the roof panel. The first and second lifters each include a guide member slidably mounted within the guide rail, a slider member movably disposed within the guide member and first and second pivotally connected links which are connected between the slider member, the guide member and the movable roof panel and are movable between collapsed and extended positions to raise and lower the roof panel. A stop member is provided to limit forward movement of the first link to cause an extension of the first and second links from the collapsed and the extended or partially extended positions.

10 Claims, 11 Drawing Figures

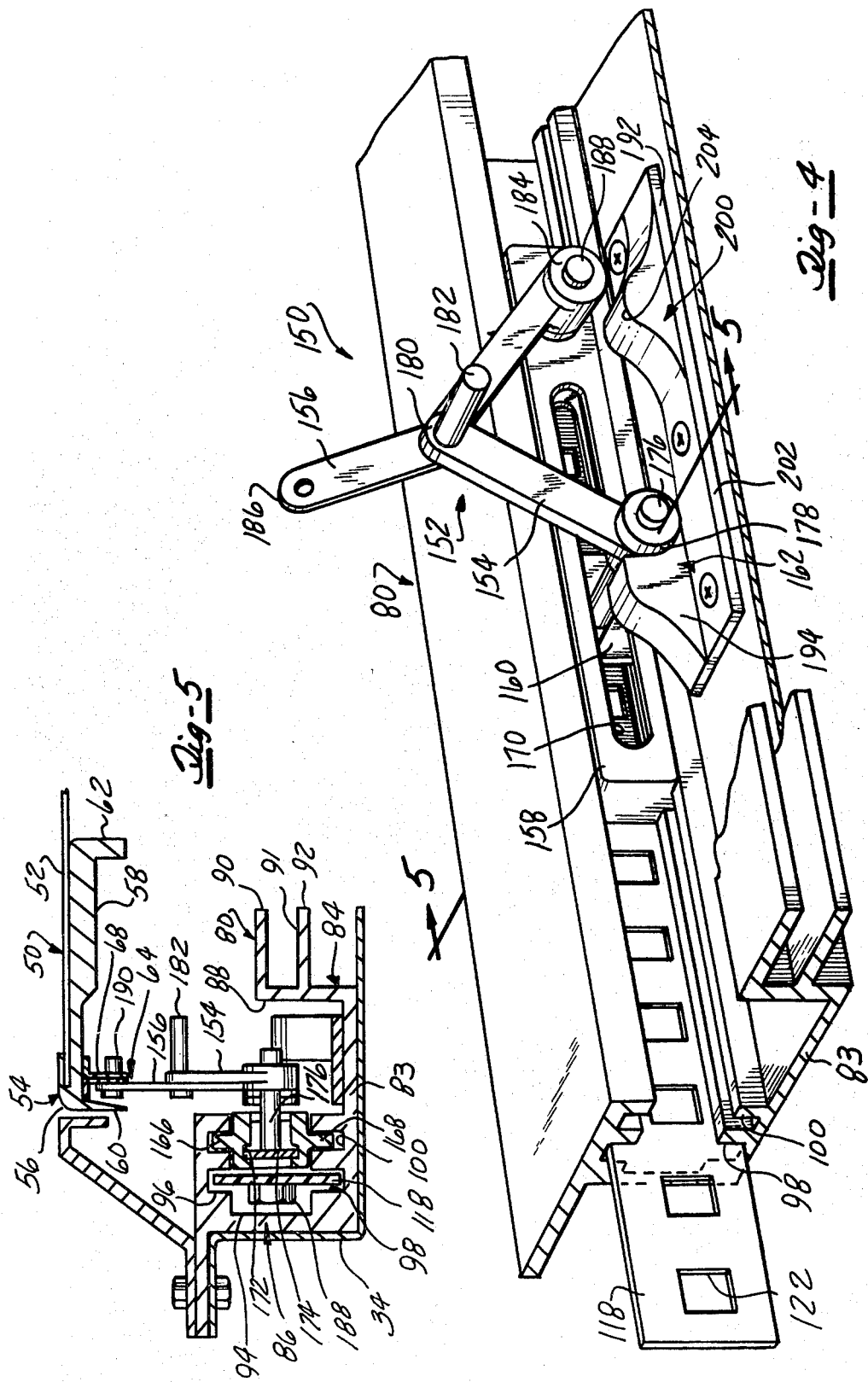

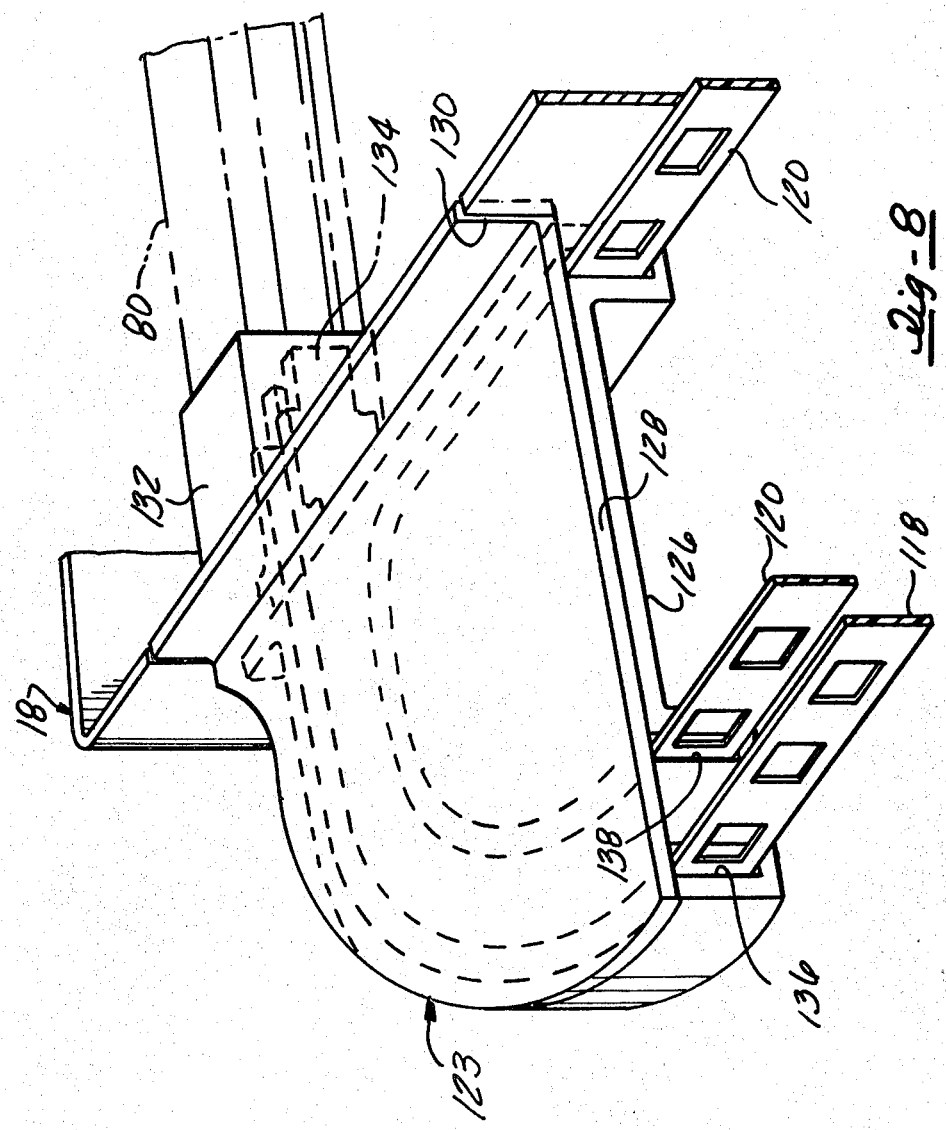

PIVOTAL-SLIDING ROOF PANEL APPARATUS

BACKGROUND OF THE INVENTION

1. Field of the Invention

This invention relates, in general, to vehicle roof structures and, more specifically, to vehicle roof structures including a movable roof panel for opening and closing an opening in the roof of a vehicle.

2. Description of the Prior Art

In today's automobile market, a popular option is the so-called "sun" or "moon" roof. The sunroof comes in two types, either in the form of a movable roof panel which is retractable between closed and open positions in an opening formed in the roof of the vehicle or a flip-up ventilator version which is pivotal about the front end to raise the rear edge of the roof panel a small amount above the stationary roof structure. It is also known to construct a movable roof panel which is both flip-up and sliding, as shown in U.S. Pat. No. 4,085,965.

However, the known roof panel assemblies present several disadvantages in view of the recent trend towards smaller and lighter weight vehicles. The mechanical components and structure needed to construct a movable roof panel assembly and, in particular, a flip-up/sliding type of roof panel assembly, are heavy and consume a considerable amount of space within the interior of the vehicle. This is especially undesirable due to the smaller size of the vehicles currently being produced.

Thus, it would be desirable to provide a pivotal-sliding roof panel structure for vehicles which overcomes the problems of similar prior art roof structures. It would also be desirable to provide a pivotal-sliding roof panel structure which provides both sliding and flip-up modes of operation. Finally, it would be desirable to provide a pivotal-sliding roof panel structure which is lighter in weight, provides increased interior head room and an enlarged viewing or window area and is made with a smaller number of components than previous roof panel structures.

SUMMARY OF THE INVENTION

There is disclosed herein a new and improved pivotal-sliding roof panel apparatus for vehicles having an opening in the roof thereof. The pivotal-sliding roof panel apparatus includes an integrally formed housing constructed of a plastic material which is adapted to be mounted to the interior of the stationary roof structure of the vehicle. A roof panel is movably mounted within the housing. Drive means, mounted on the housing, are operably connected to the movable roof panel for causing selective movement of the roof panel. Guide rails are mounted on the housing and extend in the sliding direction of the movable roof panel. Lifter means, connected between the housing and opposed sides of the movable roof panel, are provided for raising and lowering the roof panel. Each of the lifter means includes first and second pivotally connected links which are operative to raise and lower the roof panel. Guide means are slidably disposed within the guide rails and are connected to and moved by the drive means. A slider member is slidably disposed within the guide means. The first and second links are pivotally connected between the guide means, slider member and the movable roof panel for controlling movement of the movable roof panel. Stop means are provided for stopping the forward movement of the first link such that the lifter means moves to a partially-extended position from a collapsed position raising the roof panel to the closed position and, upon continued driving movement, to a fully extended position.

In the preferred embodiment, the first link is pivotally connected at a first end to an intermediate portion of the second link and, at a second end, to the slider member disposed within the guide means. The second link is pivotally connected at a first end to the guide means and, at a second end, to the movable roof panel.

The drive means comprises a drive motor mounted on the housing and first and second belts which are respectively connected to opposed ones of the guide means. Preferably, the first and second drive belts are in the form of elongated flexible strips and include a plurality of spaced apertures along their length. Means, rotatably driven by the drive motor, engages the apertures in the belts so as to cause selective reversible movement of the belts.

The apparatus of the present invention also includes detector means operative to detect when the movable roof panel is in the closed position closing the opening in the roof of the vehicle. The detector means further includes control means, responsive to the detector means, for selectively connecting an actuator means to the drive motor to energize the drive motor to move the roof panel from the closed position to either one of the fully opened or partially opened, venting positions.

The pivotal-sliding roof panel apparatus of the present invention provides many significant advantages over similar prior art sliding roof assemblies. Construction of the pivotal-sliding roof panel apparatus from a relatively small number of lightweight components results in a roof panel apparatus which is light in weight which makes it ideally suited for today's smaller and lighter automobiles. The pivotal-sliding roof panel apparatus may also be constructed as a modular assembly and installed on a vehicle as a one piece unit which greatly simplifies the installation procedure. Finally, the unique lifter mechanism incorporated into the pivotal-sliding roof panel apparatus of the present invention is compact in size which contributes to increased head room within the vehicle and an enlarged viewing area on the movable roof panel.

BRIEF DESCRIPTION OF THE DRAWING

The various features, advantages and other uses of the present invention will become more apparent by referring to the following detailed description and drawing in which:

FIG. 4 is a perspective view, partially sectioned, of the lifter mechanism;

FIG. 5 is a cross-sectional view generally taken along line 5—5 of FIG. 4;

FIG. 8 is a perspective view of one of the driver belt corner guides;

DESCRIPTION OF THE PREFERRED EMBODIMENTS

Figure 1:
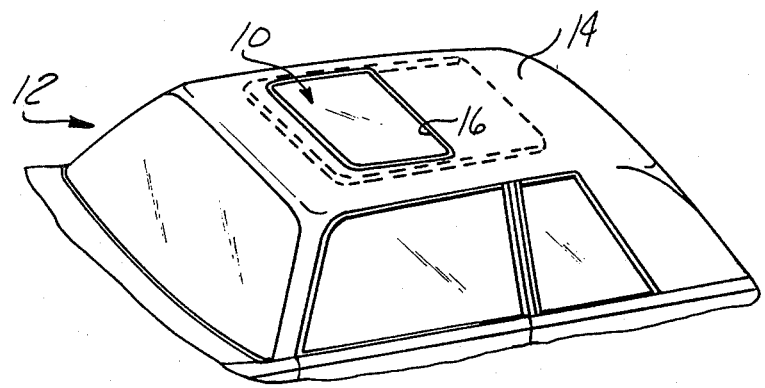
FIG. 1 is a partial, perspective view of a vehicle having a pivotal-sliding roof panel apparatus constructed in accordance with the teachings of the present invention mounted therein.

Throughout the following description and drawing, an reference number is used to refer to the same component shown in multiple figures of the drawing.

Referring now to the drawing, and to FIG. 1 in particular, there is shown a pivotal-sliding roof panel apparatus 10 which is adapted to be mounted in the roof of a vehicle 12. The vehicle 12 includes a stationary roof structure 14 having an opening 16 formed therein. The opening 16 is preferably of rectangular configuration and is situated over the front seat of the vehicle 12. The opening 16 is opened and closed by a movable roof panel which slides between closed and opened positions as well as pivoting to a flip-up position.

Figure 2:
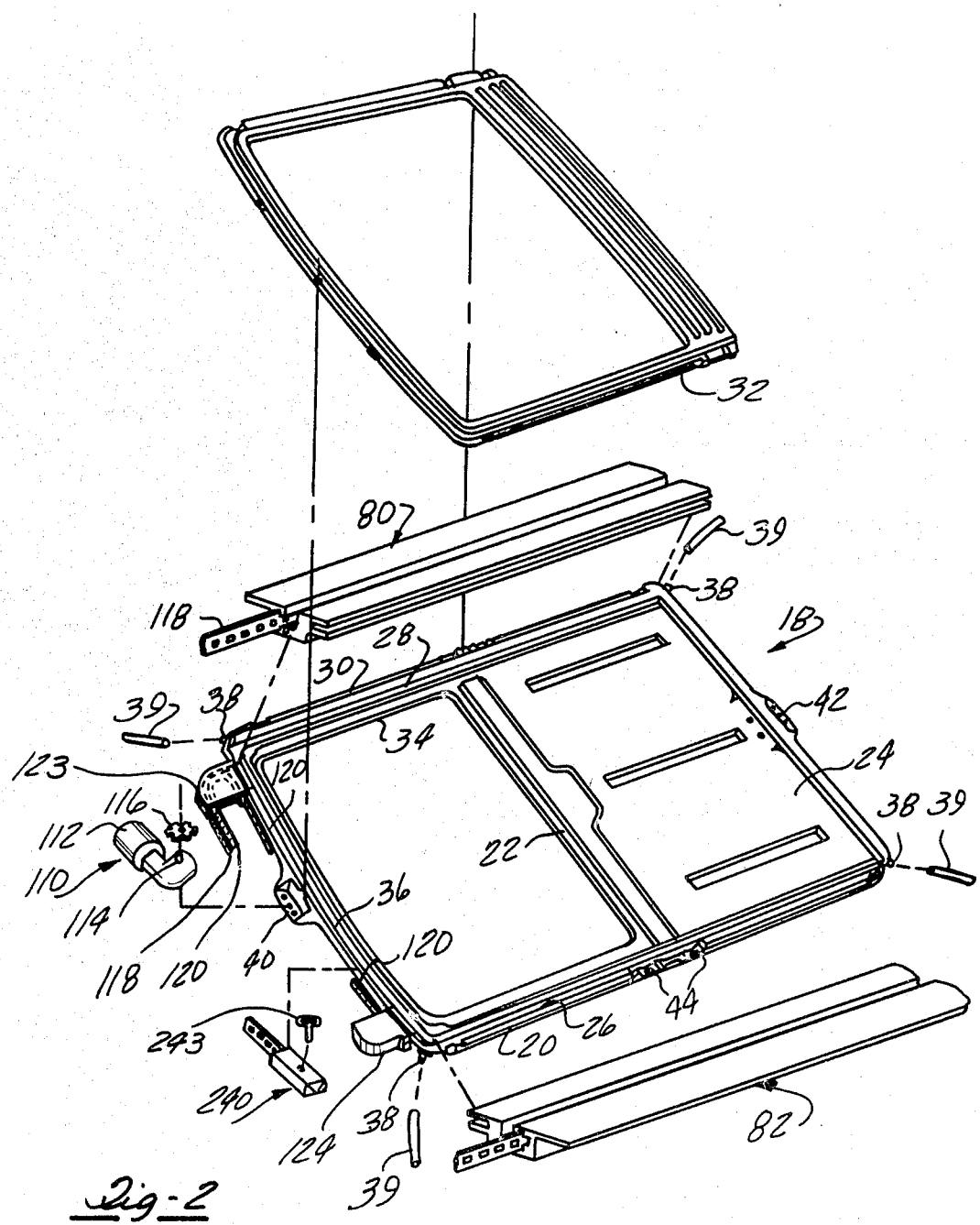
FIG. 2 is an exploded, perspective view of the pivotal-sliding roof panel apparatus of the present invention.

Referring now to FIG. 2, there is shown a frame or housing assembly 18 which is adapted to be mounted to the interior of the stationary roof structure 14 of the vehicle 12. The frame 18 includes an integrally formed substantially rectangular housing 20. The housing 20 includes an aperture 22 which is configured to the approximate shape of the opening 16 in the roof 14 of the vehicle 12 and a planar solid rear section 24.

Preferably, the housing 20 is formed in an integral one piece unit from a stamped, lightweight material, such as fiberglass sheet molding compound (CSMC). Other materials, such as nylon or polypropylene based compounds, having the requisite high strength and lightweight properties may also be used to form the housing 20. The housing 20 is formed to include mounting brackets, drain openings and stiffening ribs, as will be described in greater detail hereafter.

Specifically, the housing 20 is formed with side drain troughs 26 and 28 which extend longitudinally along the sides of the housing 20. The housing 20 is formed with an outwardly extending flange portion 30 which is adapted to be secured to a panel opening reinforcement member 32. Each of the identically formed side drain troughs, such as drain trough 26, is formed with a channel-like trough section which is connected between the outward flange 30 and an inward extending flange portion 34 which serves as a mounting base for the guide rails of the pivotal-sliding roof panel apparatus 10, as described in greater detail hereafter.

The side drain troughs 26 and 28 communicate with a front drain trough 36, shown in FIG. 2, which extends across the front of the housing 20. The corners of the housing 20 are formed into hollow conduits 38 which are adapted to be connected to suitable conduits or tubes 39 which extend through the body of the vehicle 12 to form means for diverting water collected in the drain troughs 26, 28, and 36 of the housing 20 from the pivotal-sliding roof panel apparatus 10 of the present invention.

Finally, the housing 20 is formed with front and rear mounting pads 40 and 42, respectively. The mounting pads 40 and 42 serve as a means for mounting the drive means, described hereafter, to the housing 20. This enables the drive means to be selectively mounted on either of the front or rear ends of the housing 20 depending upon the particular vehicle construction and application of the pivotal-sliding roof panel apparatus 10.

As shown in FIG. 2, the housing 20 is adapted to be mounted to a panel opening reinforcement ring 32 which is of substantially rectangular configuration. The panel opening reinforcement ring 32 is formed of a metallic material, such as steel, and is adapted to be secured to the interior stationary roof structure 14 of the vehicle 12 by suitable means, such as by welding. The housing 20 is then secured by conventional fasteners through mounting brackets 44 to the reinforcement ring 32 to thereby mount the roof panel apparatus 10 to the interior roof structure of the vehicle 12.

Figure 3:
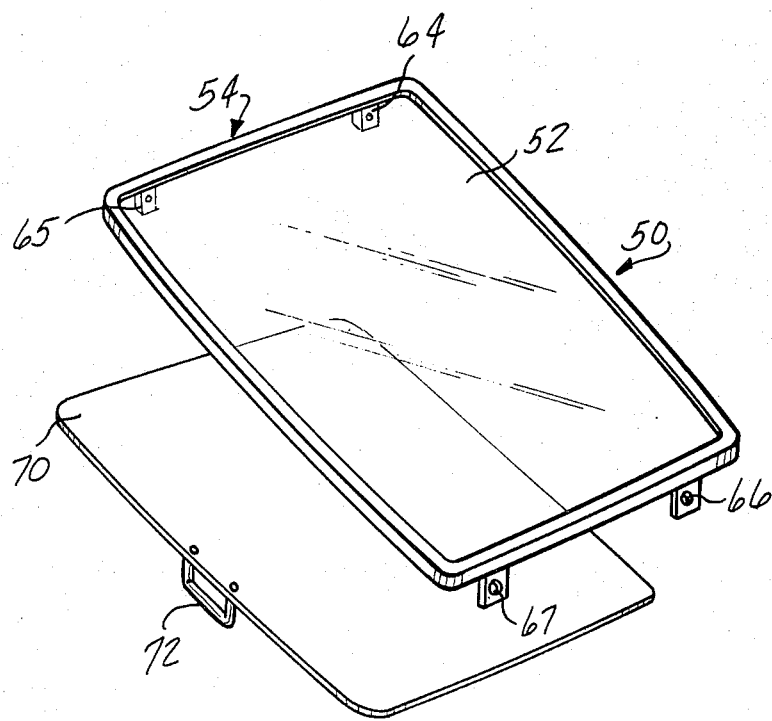
FIG. 3 is an exploded, perspective view of the movable roof panel assembly.

Referring now to FIG. 3, there is shown the detailed construction of the movable roof panel assembly 50. The movable roof panel assembly 50 includes a rectangularly shaped panel 52 which is preferably formed of transparent glass, although other translucent or opaque materials may also be used. The panel 52 is formed to approximately the same shape as the opening 16 in the roof 14 of the vehicle 12 so as to completely close the opening 16 when moved to the fully closed position. A casing or gasket 54 formed of a plastic material, such as polyvinyl chloride, is molded around the peripheral edge of the panel 52 and forms a means for supporting the panel 52.

As shown in greater detail in FIG. 5, the casing 54 is formed with an upper lip 56 which extends over the upper surface of the panel 52 and a base portion 58 which is disposed in registry with the bottom surface of the roof panel 52. Downward extending flanges 60 and 62 extend from the base portion 58 and have a varying cross section along the length of the panel 52. Mounting brackets 64 and 66 are integrally molded in the casing 54 along opposed side edges of the panel 52 and extend downward therefrom to provide a suitable mounting means for connecting the movable roof panel 50 to the lifter means, as described in greater detail hereafter. Preferably, the mounting brackets 64 and 66 are located adjacent the rear edge of the roof panel 52. Forward located brackets 65 and 67 are are also molded in the casing 54 for connection to the front guide shoes of the roof panel apparatus 10.

As shown in FIG. 5, the brackets 64, 65, 66 and 67 have a substantially T-shaped configuration with an upper portion being molded in the casing 54. A flange or leg 68 extends downward from the upper portion thereof and has an aperture formed therein for mounting the sliding roof panel 52 to the other components of the pivotal-sliding roof panel apparatus 10.

As shown in FIG. 3, the movable roof panel assembly 50 also includes a manually operable sunscreen 70 formed of an opaque material. The sunscreen 70 rides within the housing and enables the interior of the vehicle 12 to be completely closed off from view. A handle 72 is affixed to the front of the sunscreen 70 to enable the sunscreen 70 to be manually moved between opened and closed positions as desired.

As shown in FIGS. 2, 4 and 5, the pivotal-sliding roof panel apparatus 10 further includes a pair of guide rails 80 and 82 which are mounted on opposed sides of the inward extending flange 34 of the housing 20. The guide rails 80 and 82 are in the form of elongated members which are oriented to extend in the sliding direction of the movable panel 50.

As shown in FIG. 5, each of the guide rails, such as guide rail 80, is formed as an extrusion having a channular cross section defined by a substantially flat bottom 83 and a pair of spaced, upward extending side walls 84 and 86 each of complex configuration.

The first side wall 84 has a vertical wall portion 88 extending upward from the bottom wall 83 and a pair of horizontally extending spaced flanges 90 and 92 extending outward therefrom. The flanges 90 and 92 define a slot 91 therebetween which slidably receives the sunscreen 70 shown in FIG. 3.

The second upstanding side wall 86 of the guide rail 80 is formed with a vertical wall section 94 which extends upward from the bottom wall 83 and terminates in a horizontal top flange 96. Spaced pairs of aligned slots are formed in the bottom wall 83 adjacent the second side wall 86 and the top flange 96 of the second side wall 86 to form first and second spaced, substantially horizontally extending channels 98 and 100, respectively.

Referring again to FIG. 2, there is shown a drive means 110 which is provided for moving the roof panel 50 between closed, partially opened and fully opened positions. According to the preferred embodiment of the present invention, the drive means 110 comprises a reversible electric motor 112 having a vertically extending output shaft 114. A sprocket gear 116 having a plurality of outwardly extending teeth or projections is fixedly mounted to the output shaft 114 for rotary movement therewith.

The motor 112 is mounted on either of the front or rear mounting pads 40 or 42 on the housing 20 depending upon the particular application of the pivotal-sliding roof panel apparatus 10 of the present invention.

The drive means 110 further includes a pair of drive belts 118 and 120. Each of the drive belts 118 and 120 is in the form of a flat, planar elongated strip formed of a flexible plastic material, although other materials may also be used. Each of the belts 118 and 120 has a plurality of spaced apertures 122, preferably in the form of square or rectangular windows, formed along its length. The apertures 122 are engaged by the teeth on the sprocket gear 116 which causes movement of the drive belts 118 and 120 when the motor 112 is energized.

As shown in FIG. 2, the drive belts 118 and 120 are oriented on edge so as to pass on opposed sides of the sprocket gear 116 and be engaged and driven by the sprocket gear 116 in either forward or reverse directions.

As shown in FIG. 2, and in greater detail in FIG. 8, corner guide means 123 and 124 for mounted along opposed sides of the front edge of the housing 20. Each of the corner guide means 123 and 124 has a substantially arcuate shape and includes a bottom member 126 and a top cover member 128.

The cover member 128 has a substantially L-shaped cross-sectional configuration with one leg being mounted in a slot 130 formed along the front flange of the housing 20. A block member 132 integrally formed with the cover member 128 is adapted to engage the end of one of the guide rails, such as guide rail 80. A key 134 is disposable within the block 132 to engage the second channel 100 in the guide rail 80 so as to align the guide means 123 and 124 with the opposed guide rails 80 and 82.

Each of the bottom members 126 of the guide means 123 and 124 has a first, arcuate, internal slot or channel formed therein, such as channel 136 in the guide means 123. One end of the channel 136 is aligned and communicates with the first channel 98 in the guide rails to form a continuous extension thereof. In this manner, the drive belts 118 and 120 are directed in a controlled manner from the guide rails 80 and 82, around the front corners of the housing 20, across the front of the housing 20 and past to the drive motor 112 and sprocket gear 116.

As shown in FIG. 8, one of the guide means, such as guide means 123, has a second internal slot or channel 138 formed therein. The second channel 138 is substantially U-shaped with its ends aligned in a common plane so as to loop back on itself. In this manner, the end of one of the drive belts, such as drive belt 120, is looped back on itself to prevent interference with the other drive belt 118 as the belts move.

The pivotal-sliding roof panel apparatus 10 of the present invention includes lifter means connected between opposed sides of the housing and the roof panel assembly 50 for effecting raising and lowering of the roof panel assembly 50. As each of the lifter means is identically constructed, only one of the lifter means, such as lifter means 150 illustrated in FIG. 4, will be described in detail hereafter. The lifter means 150 includes a linkage 152 comprised of first and second pivotally connected links 154 and 156, respectively. The lifter means 150 further includes guide means 158 which is slidably disposed within the second channel 100 in the guide rail 80 and slider means 160 slidably disposed within the guide means 158. Stop means 162 are provided for limiting forward movement of the lifter means 150 at a predetermined position along the guide rail 80.

As shown in FIGS. 4 and 5, the guide means 158 is in the form of an elongated block having upper and lower outwardly extending projections 166 and 168 which are disposable within and slideable along the slots forming the second channel 100 in the guide rail 80. The block 158 further includes an internal slot 170 which has an enlarged side portion 172, as shown in FIG. 5.

The slider member 160 includes a plate 174 which is slidably disposed within the enlarged portion 172 of the slot 170 in the guide block 158. An outwardly extending, cylindrical pivot pin 176 is joined to one side of the plate 174 and extends outward therefrom.

The first link 154 has a planar elongated form with apertures formed at opposed ends thereof. The first link 154 is pivotally connected about the pivot pin 176 at a first end 178. The opposed or second end 180 of the first link 154 is pivotally connected by pivot pin 182 to an intermediate portion of the second link 156.

The second link 156 has a flattened V-shape such that its ends 184 and 186 are disposed at a predetermined angular relationship. The first end 184 of the second link 156 is pivotally connected by pivot pin 188 to the guide block 158. Preferably, as shown in FIG. 5, the pivot pin 188 extends completely through the guide block 158 and drive belt 118 to secure the second link 156 to both the drive belt 118 and the guide block 158. The second or opposed end 186 of the second link 156 is adapted to be connected by suitable fastening means 190 FIG. 5 to the mounting bracket 64 attached to the movable roof panel assembly 50.

The stop means 162 is in the form of an elongated plate 192 which is secured to the bottom wall 83 of the guide rail 80 by suitable fasteners. The stop means 162 has an upwardly extending catch portion 194 formed at one end thereof which is adapted to catch and hold the first end 178 of the first link 154 to prevent further forward horizontal motion of the first link 154.

Figure 6:
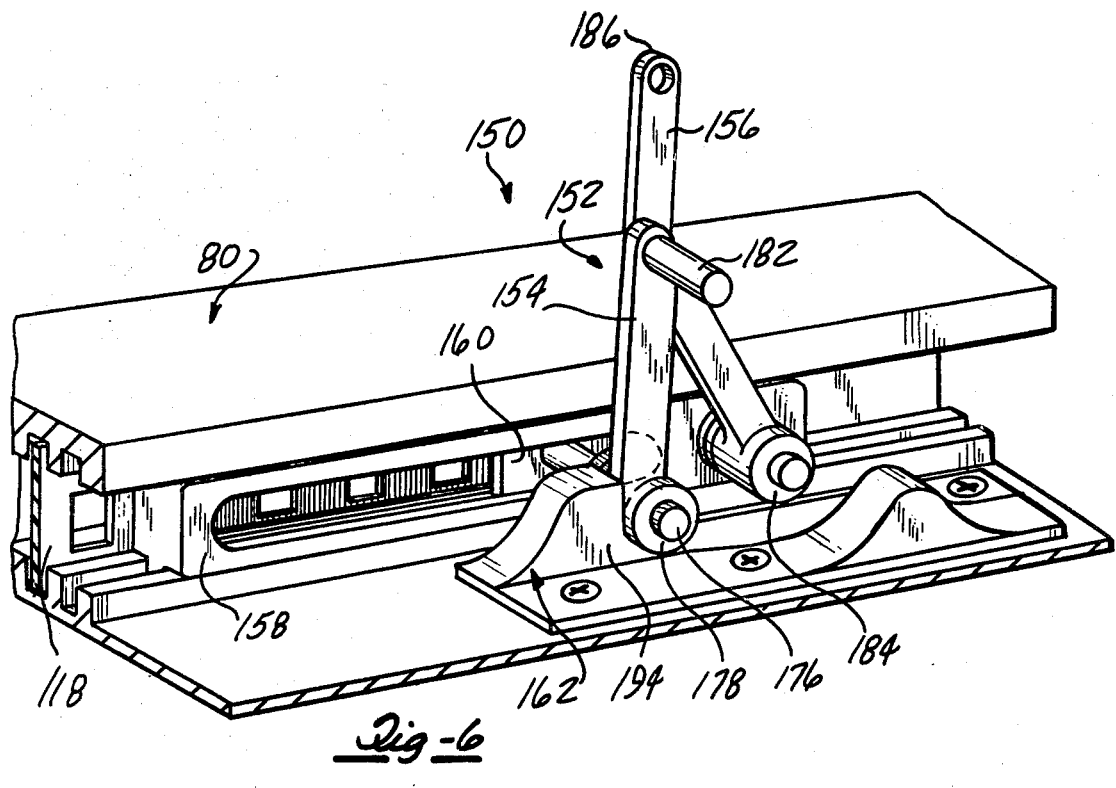
FIG. 6 is a partial, perspective view of the lifter mechanism showing the position of the components of the lifter mechanism when in the partially extended position.
Figure 7:
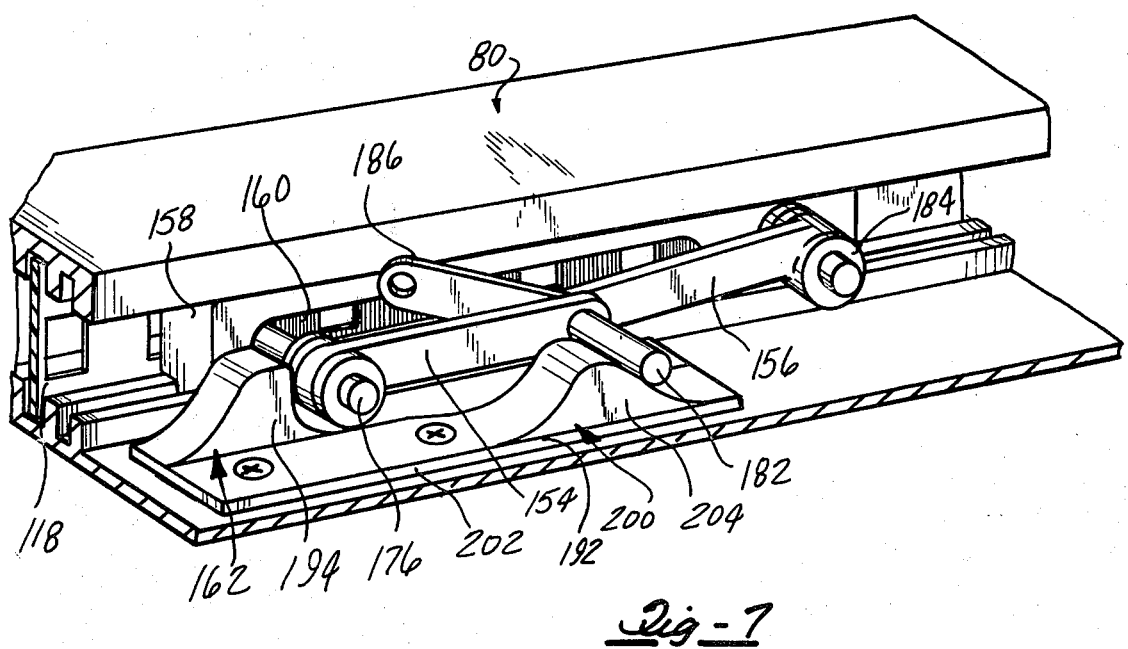
FIG. 7 is a partial, perspective view of the lifter mechanism showing the position of the components of the lifter mechanism when in the collapsed position.

Referring now to FIGS. 4, 6 and 7, the operation of the lifter means 150 of the present invention will now be described. In FIG. 4, the lifter means 150 is depicted in the partially extended position in which the roof panel assembly 50 completely closes the roof opening 16 in the vehicle 12. In this position, the first end 178 of the first link 154 engages and held in a fixed position by the catch 194 on the stop means 162 and the member 160 is disposed substantially centrally within the guide block 158.

In order to move the roof panel assembly 50 to the partially opened, venting position, illustrated in FIG. 6, the drive motor 112 is energized to move the drive belts 118 and 120 toward the front of the vehicle 12. This pulls the guide block 158 attached to each of the drive belts 118 in a forward direction causing the first end 184 of the second link 156 to likewise move in a forward horizontal direction toward the first link 154. In so doing, the first link 154 pivots about the pivot pin 176 in a counterclockwise direction causing the pivot pin 182 to similarly move along a counterclockwise arcuate path. This has the effect of causing the second end 186 of the second link 156 to move in an upward clockwise path raising the movable roof panel assembly 50 upward to the venting position.

To lower the roof panel to the fully closed position again, the drive motor 112 is reversed so as to move the drive belts 118 and 120 in a rearward direction which separates the first ends 178 and 184 of the first and second links 154 and 156 and partially collapses the linkage 152.

In order to move the roof panel assembly 50 from the closed position to the fully opened position in which the roof opening 16 is completely exposed, the drive motor 112 is continually energized in a reverse manner causing the drive belts 118 and 120 to continue to move in a rearward direction. This pushes each guide block 158 and the first end 184 of the second link 156 in a rearward direction causing the second end 186 of the second link 156 and the movable roof panel assembly 50 connected thereto to lower so as to slip the rear edge of the movable roof panel assembly 50 below the stationary roof panel structure 14 of the vehicle 12. The movable roof panel 50 lowers until the first and second links 154 and 156 are disposed in an in-line, substantially horizontal orientation, as shown in FIG. 7, which provides a rigid linkage for driving the movable roof panel assembly 50 in a substantially horizontal rearward direction.

As the movable roof panel assembly 50 is moved from the fully opened to the fully closed position, the aligned first and second links 154 and 156 again provide a rigid linkage for pulling the roof panel assembly 50 toward the front end of the vehicle 12. As the first link 154 nears the stop means 162, it is necessary that the rigid linkage between the aligned first and second links 154 and 156 be broken such that the lifter means 150 may be raised to the extended position. Thus, cam means 200 is secured to the guide rail 80. The cam means 200 includes a plate 202 and an inclined portion 204 which is engaged by the pivot pin 182 connecting first and second links 154 and 156 as the lifter means 150 moves toward the forward end of the vehicle 12. The pivot pin 182 rides up along the incline 204 breaking the rigid connection between the first and second links 154 and 156 and enabling the lifter means 150 to move to the extended position when the first end 178 of the first link 154 engages the catch 194 of the stop means 162, as described previously.

In order to prevent any rearward movement of the roof panel assembly 50 before the rear edge thereof has dropped below the edge of the stationary roof structure 14 of the vehicle 12, a locking means 210 is provided. The locking means 210, as shown in FIG. 9, functions to hold the forward end of the roof panel assembly 50 stationary until the lifter means 150 has collapsed and lowered the rear edge of the roof panel assembly 50 below the stationary roof structure 14 of the vehicle 12.

The locking means 210 includes a spring clip 212 which is affixed at one end to a water trough 230 at one end. The spring clip 212 is formed of a resilient material and is biased in a downward direction. The clip 212 has a depression 214 formed centrally therein which is adapted to engage a recess or notch 216 formed in the guide rail 80. A finger 218 extends outward from the guide block 158 to engage an upstanding flange formed at the end of the clip 212 and disengage the depression 214 from the notch 216.

In operation, the depression 214 in the clip 212 will be seated in the notch 216 when the roof panel assembly 50 is in the flipped-up, venting position. As the roof panel 50 is lowered, the guide block 158 moves in a rearward direction. However, the clip 212 will hold the water trough 230 and the front guide shoes which are connected thereto via a connecting rod 220 in a stationary position. When the rear edge of the roof panel 50 has been lowered sufficiently to clear the rear stationary roof structure 14 of the vehicle 12, the guide block 158 will have moved rearward to a position in which the finger 218 engages the upstanding flange on the clip 212 and urges the clip 212 upward until the depression 214 is released from the notch 216. This frees the entire movable roof panel 50 for rearward horizontal movement.

Figure 10:
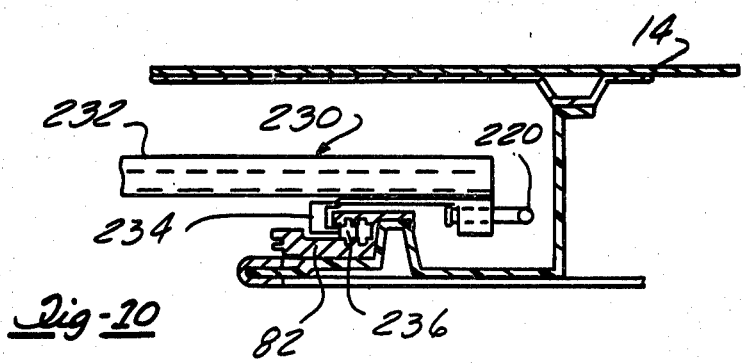
FIG. 10 is a partial, sectional view of one end of the water trough.
Figure 9:
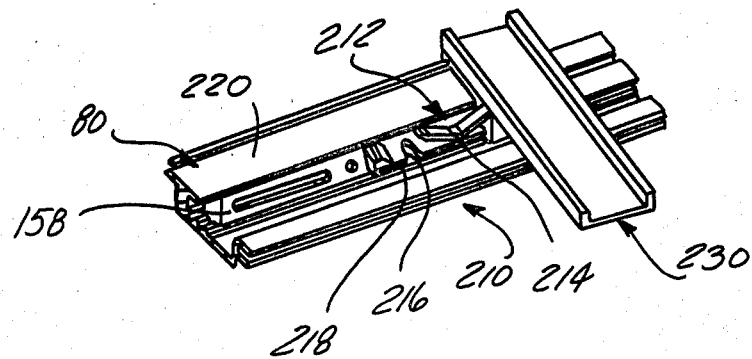
FIG. 9 is a partial, perspective view of the roof panel locking means.

Referring now to FIGS. 9 and 10, there is shown a water trough 230 which is adapted to divert water from the rear edge of the movable roof panel assembly 50 to the sides of the housing 20. The trough 230 is in the form of a channel-like member 232 which extends laterally across the vehicle. According to the preferred embodiment, the water trough 230 is movable in conjunction with the movement of the movable roof panel assembly 50 between open and closed positions so as to divert water entering the roof opening adjacent the rear edge of the movable roof panel assembly 50 to the sides of the housing 20 and thence through the drain conduits and out of the vehicle. Accordingly, a pair of guide shoes 234, each associated with one of the guide rails 80 and 82, are secured to the bottom surface of the channel member 232 at opposite ends thereof. The guide shoes 234 are formed with an outer flange portion 236 which rides in one of the channels of the guide rails to control the sliding movement of the water trough 230.

Means, denoted in general at reference number 220, is provided for connecting the water trough 230 to the front guide shoes so as to transmit movement of the front guide shoes to the water trough 230. According to the preferred embodiment, the connecting means 220 is in the form of an elongated rod member having its first end secured or molded to the front guide shoe and its rear end molded or otherwise secured to the guide shoe 234 affixed to the water trough 230. In this manner, the water trough 230 moves concurrently with movement of the front guide shoes between open and closed positions. In addition, the water trough 230 remains in its forward position adjacent the rear edge of the roof opening 16 when the movable roof panel assembly 50 is pivoted to the flip-up venting position.

Figure 11:
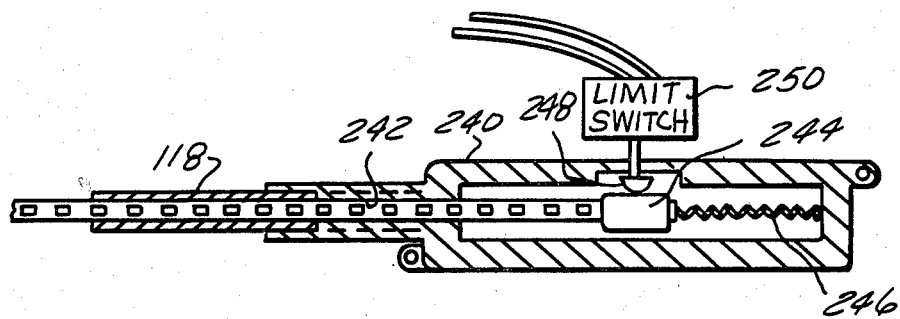
FIG. 11 is a sectional view of the control unit of the present invention.

As shown in FIG. 2, and in greater detail in FIG. 11, the pivotal-sliding roof panel apparatus 10 further includes control means for controlling the movement of the movable roof panel 50 between open and closed positions and between closed and venting positions. The control means includes a housing denoted in general at reference number 240 which is mounted to the internal roof structure of the vehicle adjacent the front of the roof panel housing 20. The housing 240 includes a hollow bore 242 which is adapted to receive one end of one of the drive belts, such as drive belt 118 shown in FIG. 2. One end of the drive belt 118 is slidably insertable within the interior of the housing 240 and contacts a movable actuator 244 which is biased by a biasing means 246, such as a coil spring, to a central or neutral position within the housing 240, as shown in FIG. 11. The housing 240 is positioned such that the end of the drive belt 118 will urge the actuator 244 to the neutral position when the movable roof panel assembly 50 is in the completely closed position. An arming pin 243, shown in FIG. 2, is removably inserted through an aperture in the housing 240 to engage the actuator 244 and hold it in the neutral position until the housing 240 is secured in the desired position on the housing 20.

In the neutral position, the actuator 244 trips a plunger 248 connected to a conventional electrical limit switch 250 causing the output contacts of the limit switch 250 to move to a closed position. The contacts of the limit switch 250 are connected in a suitable control circuit arrangement, not shown, with the drive motor 112 and occupant operated actuator means or switches for controlling the movement of the roof panel between open and closed positions.

A more complete description of the operation and function of the control means may be had by referring to co-pending application, Ser. No. 196,468, now U.S. Pat. No. 4,379,586, the contents of which are incorporated herein by reference.

Thus, there has been disclosed a pivotal-sliding roof panel apparatus for a vehicle having an opening in the roof thereof. The apparatus is constructed as a modular unit which can be installed as a one-piece unit assembly on the vehicle thereby simplifying and expediting the installation process.

The unique pivotal-sliding roof panel apparatus disclosed herein includes a novel lifter mechanism which is operative for moving the roof panel between closed, fully opened and and partially-opened, venting positions. In addition, the lifter mechanism is compact in size such that the amount of interior space within the vehicle that is consumed by the roof panel apparatus is minimized.

What is claimed is:

1. A pivotal-sliding roof panel apparatus adapted to be mounted to the stationary roof structure of a vehicle having an opening in the roof thereof which is opened and closed by a movable roof panel, the apparatus comprising:
    a housing adapted to be mounted to the stationary roof structure of the vehicle, the housing having an aperture alignable with the opening in the roof of the vehicle;
    a roof panel movably mounted within the housing;
    drive means, mounted on the housing and operably connected to the movable roof panel, for causing selective movement of the movable roof panel;
    guide rails mounted on the housing and extending in the sliding direction of the movable roof panel;
    first and second lifter means, connected between the housing and opposed sides of the movable roof panel for raising and lowering the movable roof panel, the first and second lifter means each comprising:
    first and second pivotally connected links movable between collapsed and extended positions;
    guide means slidably disposed within the guide rails, the guide means connected to and moved by the drive means;
    a slider member slidably disposed within the guide means;
    the first link pivotally connected at a first end to an intermediate portion of the second link and at a second end to the slider member;
    the second link pivotally connected at a first end to the guide means and at a second end to the movable roof panel; and
    stop means for stopping the forward movement of the first link such that the lifter means moves to a partially-extended position from the collapsed position raising the roof panel to a closed position and, upon continued movement of the drive means, to a fully-extended position raising the roof panel to a partially-opened venting position.

2. The apparatus of claim 1 further including cam means mounted on the guide rails and engageable with the pivot point between the first and second links as the roof panel means moves between the closed and opened positions to urge the pivot point upward.

3. The apparatus of claim 1 wherein the drive means comprises:
    a drive motor mounted on the housing;
    first and second belts connected to opposed ones of the guide means; and
    means, mounted on the motor and rotated thereby, for engaging and moving the first and second belts.

4. The apparatus of claim 3 wherein the first and second belts each include a plurality of spaced apertures along its length.

5. The apparatus of claim 3 wherein the guide rails are each formed with first and second channels, one of the first and second drive belts being slidably movable in one of the first and second channels and the guide means being slidably movable in the other of the first and second channels.

6. The apparatus of claim 3 further including:
    means for actuating the drive motor in one of two opposed directions;
    means, associated with one of the first and second belts, for detecting when the movable roof panel is in the closed position closing the aperture in the housing; and
    control means, responsive to the detecting means, for selectively connecting the actuator means to the drive motor to move the movable roof panel from the closed to one of the fully-opened and partially opened, venting positions.

7. The apparatus of claim 1 wherein the guide means comprises:
    an elongated block slidably mounted within the first and second guide rail, the block having an elongated slot formed therein for slidably receiving the slider member.

8. The apparatus of claim 5 further including:

first and second corner guide means mounted at front opposed sides of the housing for guiding the drive belts, the guide means comprising:

a housing including base and cover members;

the base member having a first arcuate channel formed therein operative for directing one of the drive belts from the front of the housing into one of the first and second channels in the guide rails; and one of the housings having a second channel formed in the base member thereof having first and second ends arranged in a common plane and operative to receive the end of the other of the first and second drive belts and direct the end back towards the other of the first and second drive belts.

9. A pivotal-sliding roof panel apparatus adapted to be mounted to the stationary roof structure of a vehicle having an opening in the roof thereof which is opened and closed by a movable roof panel, the apparatus comprising:

a housing adapted to be mounted to the stationary roof structure of the vehicle, the housing having an aperture alignable with the opening in the roof of the vehicle;

a roof panel movably mounted within the housing;

a reversible drive motor mounted on the housing;

first and second drive belts having a plurality of spaced apertures formed along their length;

means, mounted on the drive motor and rotated thereby, for engaging the aperture in the first and second drive belts;

first and second guide rails mounted on opposed sides of the housing and extending in the sliding direction of the movable roof panel, the first and second guide rails having first and second spaced channels formed therein, one of the first and second channels slidably receiving one of the first and second drive belts;

first and second filter means, connected between the housing and opposed sides of the movable roof panel, for raising and lowering the movable roof panel, the first and second lifter means each comprising:

a guide block slidably disposed in the other of the first and second channels in the first and second guide rails and connected to one of the first and second drive belts for sliding movement therewith, the guide block having an elongated slot formed therein;

a slider member slidably disposed within the slot in the guide block;

first and second pivotal links, the first link pivotally connected at a first end to an intermediate portion of the second link and at a second end to the slider member;

the second link pivotally connected at a first end to the guide means and at a second end to the movable roof panel;

stop means, mounted on the guide rails, for stopping the forward movement of the first link at a predetermined position along the guide rails such that the lifter means moves to a partially-extended position from the collapsed position raising the movable roof panel to a closed position and, upon continued movement of the drive means, to a fully-extended position raising the movable roof panel to a partially-opened venting position; and cam means mounted on the guide rails and engageable with the pivot point between the first and second links as the movable roof panel moves between the closed and opened positions to urge the pivot point upwards.

10. The apparatus of claim 9 further including:

first and second corner guide means mounted at the front opposed sides of the housing for guiding the first and second drive belts, the first and second corner guide means comprising:

a housing including base and cover members;

the base member having a first arcuate channel formed therein operative for directing one of the first and second belts from the front of the housing into one of the first and second channels in the guide rails; and one of the housings having a second channel formed in the base member thereof having first and second ends arranged in a common plane and operative to receive the end of the other of the first and second drive belts and direct the end back towards the other of the first and second drive belts.

* * * * *